United States Patent
Sekimoto

(10) Patent No.: US 10,104,293 B2
(45) Date of Patent: Oct. 16, 2018

(54) CAMERA MODULE INCLUDING SUSPENSION WIRE THAT SUPPORTS MOVING PORTION WITH IMAGE CAPTURING LENS AND METHOD FOR MANUFACTURING CAMERA MODULE

(71) Applicant: Sharp Kabushiki Kaisha, Sakai, Osaka (JP)

(72) Inventor: Yoshihiro Sekimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/310,221

(22) PCT Filed: Mar. 17, 2015

(86) PCT No.: PCT/JP2015/057898
§ 371 (c)(1),
(2) Date: Nov. 10, 2016

(87) PCT Pub. No.: WO2015/178081
PCT Pub. Date: Nov. 26, 2015

(65) Prior Publication Data
US 2017/0171469 A1 Jun. 15, 2017

(30) Foreign Application Priority Data
May 23, 2014 (JP) ................................ 2014-107452

(51) Int. Cl.
*H04N 5/232* (2006.01)
*G03B 5/00* (2006.01)
*H04N 5/225* (2006.01)
*G02B 27/64* (2006.01)

(52) U.S. Cl.
CPC ....... *H04N 5/23287* (2013.01); *G02B 27/646* (2013.01); *G03B 5/00* (2013.01); *H04N 5/2257* (2013.01); *G03B 2205/0007* (2013.01)

(58) Field of Classification Search
CPC .......................... H04N 5/23287; H04N 5/2257
See application file for complete search history.

(56) References Cited

U.S. PATENT DOCUMENTS

| 2012/0229926 A1* | 9/2012 | Wade ........................ G02B 7/08 359/824 |
| 2013/0016428 A1 | 1/2013 | Sugawara et al. |
| 2013/0039640 A1* | 2/2013 | Sekimoto ............. H04N 5/2257 396/55 |

(Continued)

FOREIGN PATENT DOCUMENTS

| CN | 202334715 U | 7/2012 |
| JP | 2013-024944 A | 2/2013 |

*Primary Examiner* — Gevell Selby
(74) *Attorney, Agent, or Firm* — Keating & Bennett, LLP

(57) ABSTRACT

Reducing the risk of fracturing of a suspension wire in a camera module that has an image stabilizing function. A camera module is provided with a joining portion (12e) that is joined to a suspension wire (16), and a flexible portion (12d) that suppresses inclination with an axis (22b) serving as a center axis, which passes through the joining point (P), and inclination of the joining portion (12e) with an axis (22a) serving as a center axis, which passes through the joining point (P) and is orthogonal to the axis (22b), and that connects the joining portion (12e) and the moving portion (30).

4 Claims, 9 Drawing Sheets

(56) References Cited

U.S. PATENT DOCUMENTS

2013/0215511 A1* 8/2013 Wu .................. G02B 27/646
                                                    359/554
2014/0232888 A1* 8/2014 Sekimoto ............ H04N 5/2257
                                                    348/208.11
2016/0241787 A1* 8/2016 Sekimoto ............ H04N 5/2257

* cited by examiner

2: LENS BARREL
5: LENS DRIVING DEVICE
50: CAMERA MODULE

1 : IMAGE CAPTURING LENS
2 : LENS BARREL
3 : ADHESIVE
4 : LENS HOLDER
5 : LENS DRIVING DEVICE
12a: AF SPRING
13 : INTERMEDIATE RETENTION MEMBER
14 : AF COIL
15 : PERMANENT MAGNET
16 : SUSPENSION WIRE
17 : COVER
18 : OIS COIL
19 : BASE
21 : HOLE ELEMENT
30 : OIS MOVING PORTION
40 : OIS FIXED PORTION
50 : CAMERA MODULE

CAMERA MODULE INCLUDING SUSPENSION WIRE THAT SUPPORTS MOVING PORTION WITH IMAGE CAPTURING LENS AND METHOD FOR MANUFACTURING CAMERA MODULE

TECHNICAL FIELD

The present invention relates to a camera module that is installed in an electronic apparatus such as a mobile phone, and in particular, to a camera module that has an image stabilizing function.

BACKGROUND ART

Models in which a camera module is incorporated inside a mobile phone account for the majority of recent mobile phones. Since these camera modules must be accommodated inside the mobile phones, the demand for reduction in size and weight is larger than that for digital cameras.

In addition, examples in which camera modules of a type that exhibits an automatic focus (AF) function using a lens driving device, are installed in electronic apparatuses such as mobile phones, are also increasing. There are various types of lens driving device such as a type that uses a stepping motor, a type that uses a piezoelectric element, and a type that uses a Voice Coil Motor (VCM), and these are already circulating on the market.

Meanwhile, in this manner, in a circumstance in which camera modules having an automatic focus function are commonplace, an image stabilizing function attracts attention as a function that has the following features. An image stabilizing function is widely adopted throughout the world in digital cameras and movies, but meanwhile, in mobile phones, since there are problems in terms of size, although there are still few adoption examples, new structures of image stabilizing mechanisms in which miniaturization is possible have been suggested, and cases are steadily increasing. In the coming years, there is a high probability that camera modules for mobile phones in which an image stabilizing function is installed, will become mainstream.

In PTL 1, a "barrel shift system" image stabilizing device is described as an image stabilizing mechanism. Since the "barrel shift system" which displaces an entire lens in an integral manner in a direction that is perpendicular to an optical axis, is excellent in terms of performance since comparative miniaturization is possible, this system is the mainstream as an image stabilizing system for mobile applications such as mobile phones including smartphones.

The camera module of PTL 1 is provided with a suspension wire in which one end is fixed to a portion (a base) on an image sensor side of the camera module, and another end is fixed to a portion (an extended portion) on a lens barrel side of the camera module. In this instance, the image sensor includes a light reception surface on the lens barrel side. An optical axis of the lens barrel extends in a direction that is substantially perpendicular to the light reception surface of the image sensor. Further, the suspension wire restricts a movement direction of the lens barrel to a direction that is perpendicular to the optical axis.

In this instance, for example, when the camera module of PTL 1 is dropped, there are cases in which an impact is applied to the suspension wire. However, even if an impact is applied to the suspension wire, and force acts in a longitudinal direction of the suspension wire, the extended portion flexes easily due to having a greater flexible property than other portions of the camera module. In this manner, the extended portion functions as a fracture prevention member that prevents fracturing of the suspension wire.

CITATION LIST

Patent Literature

PTL 1: Japanese Unexamined Patent Application Publication No. 2013-24944 (Feb. 4, 2013)

SUMMARY OF INVENTION

Technical Problem

However, in a configuration of the related art such as that described in PTL 1, fracturing of the suspension wire is not sufficiently prevented.

FIG. 10 is a diagram illustrating cross-sectional views of a fracture prevention member 101 using a suspension wire 102 of a camera module used in the related art, (a) illustrates a state in which force is not applied to the suspension wire 102, and (b) illustrates a state in which force F is applied to the suspension wire 102 in a Z axis positive direction. Additionally, in FIGS. 10(a) and 10(b), a Z axis extends in an optical axis direction of an optical system of the camera module. In addition, an X axis and a Y axis extend in directions that are perpendicular to the optical axis and are orthogonal to each other.

As illustrated in FIG. 10(a), a hole 101a is provided in the fracture prevention member 101. The suspension wire 102 is inserted into the hole 101a. Further, the fracture prevention member 101 and the suspension wire 102 are joined mechanically and electrically using solder 103. Additionally, a joining point P is the center of the hole 101a.

As illustrated in FIG. 10(b), when the force F is applied to the suspension wire 102, a tip end portion 101A of the fracture prevention member 101 becomes inclined in a direction R of rotation with an axis that passes through the joining point P and extends in a direction that is parallel to the Y axis, serving as the center axis. At this time, it is easy for shear stress to become concentrated at boundary sections between sections of the suspension wire 102 to which the solder 103 is attached and sections of the suspension wire 102 to which the solder 103 is not attached. As a result of this, the risk of fracturing of the suspension wire 102 is increased.

The present invention is devised in the light of the above-mentioned technical problem, and an object thereof is to provide a camera module in which the risk of fracturing of a suspension wire is low.

Solution to Problem

In order to solve the above-mentioned problem, according to an aspect of the present invention, there is provided a camera module that has an image stabilizing function, the camera module including: a moving portion that includes an image capturing lens; a fixed portion that surrounds the moving portion; a suspension wire that extends in parallel with or diagonally with respect to an optical axis of the image capturing lens, that supports the moving portion such that the moving portion moves in a direction that is perpendicular to the optical axis, and in which one end is fixed to the fixed portion; a joining portion to which another end of the suspension wire is fixed; and a flexible portion that suppresses; inclination of the joining portion with a first axis serving as the center axis, which passes through a joining point of the suspension wire and the joining portion and is orthogonal to the optical axis; and inclination of the joining portion with a second axis serving as the center axis, which passes through the joining point and is orthogonal to the first axis, and that connects the joining portion and the moving portion.

In addition, according to another aspect of the present invention, there is provided a method for manufacturing a camera module that is provided with a moving portion that includes an image capturing lens, a fixed portion that surrounds the moving portion, a suspension wire that extends in parallel with or diagonally with respect to an optical axis of the image capturing lens, that supports the moving portion such that the moving portion moves in a direction that is perpendicular to the optical axis, and in which one end is fixed to the fixed portion, and a joining portion to which another end of the suspension wire is fixed, and has an image stabilizing function, the manufacturing method including: designing a flexible portion by calculating the elastic modulus of the flexible portion such that stress, which is determined on the basis of a movable distance of the moving portion, a cross-sectional area and spring constant of the suspension wire, and a spring constant of the flexible portion, is less than buckling stress of the suspension wire; and connecting the joining portion and the moving portion such that the flexible portion suppresses; inclination of the joining portion with a first axis serving as the center axis, which passes through a joining point of the suspension wire and the joining portion and is orthogonal to the optical axis; and inclination of the joining portion with a second axis serving as the center axis, which passes through the joining point and is orthogonal to the first axis.

Advantageous Effects of Invention

According to each aspect of the invention, it is difficult for the suspension wire to break due to an impact (for example, rapid movement of the camera module as a result of being dropped). That is, the invention exhibits an effect of being able to reduce the risk of fracturing of the suspension wire.

DESCRIPTION OF EMBODIMENTS

Embodiment 1

Figure 1:
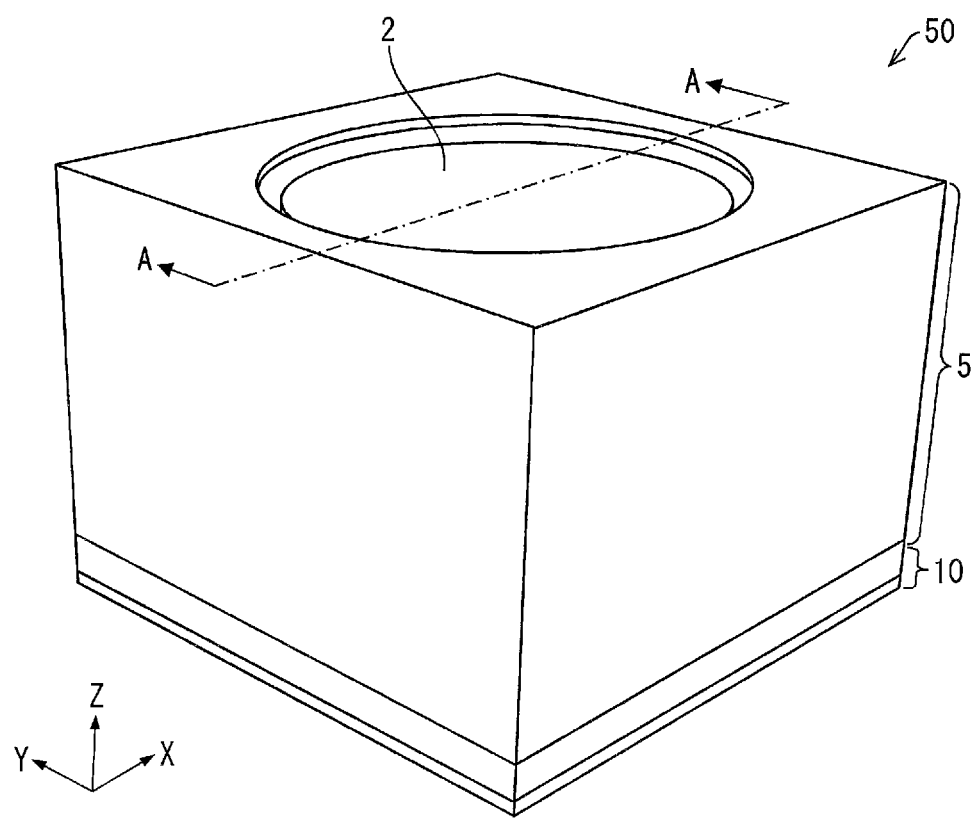
FIG. 1 is a perspective view that schematically illustrates an outline configuration of a camera module of a first embodiment of the present invention.

FIG. 1 is a perspective view that schematically illustrates an outline configuration of a camera module 50 of the present embodiment. Additionally, the XYZ axes illustrated in FIG. 1 correspond to the coordinate system axis of FIG. 2 to FIG. 10.

Figure 2:
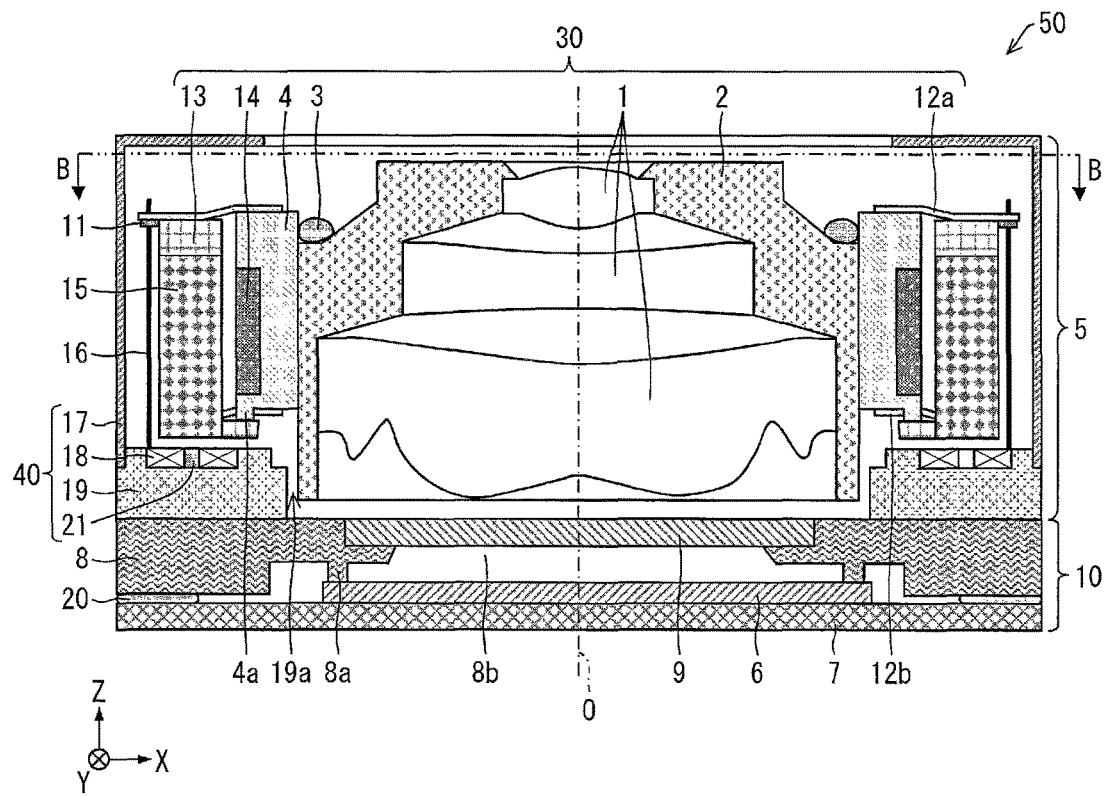
FIG. 2 is a cross-sectional view that illustrates a configuration of the camera module illustrated in FIG. 1.

FIG. 2 is a cross-sectional view that illustrates a configuration of the camera module 50 illustrated in FIG. 1. Additionally, FIG. 2 is a cross-sectional view taken along line A-A in FIG. 1.

Figure 3:
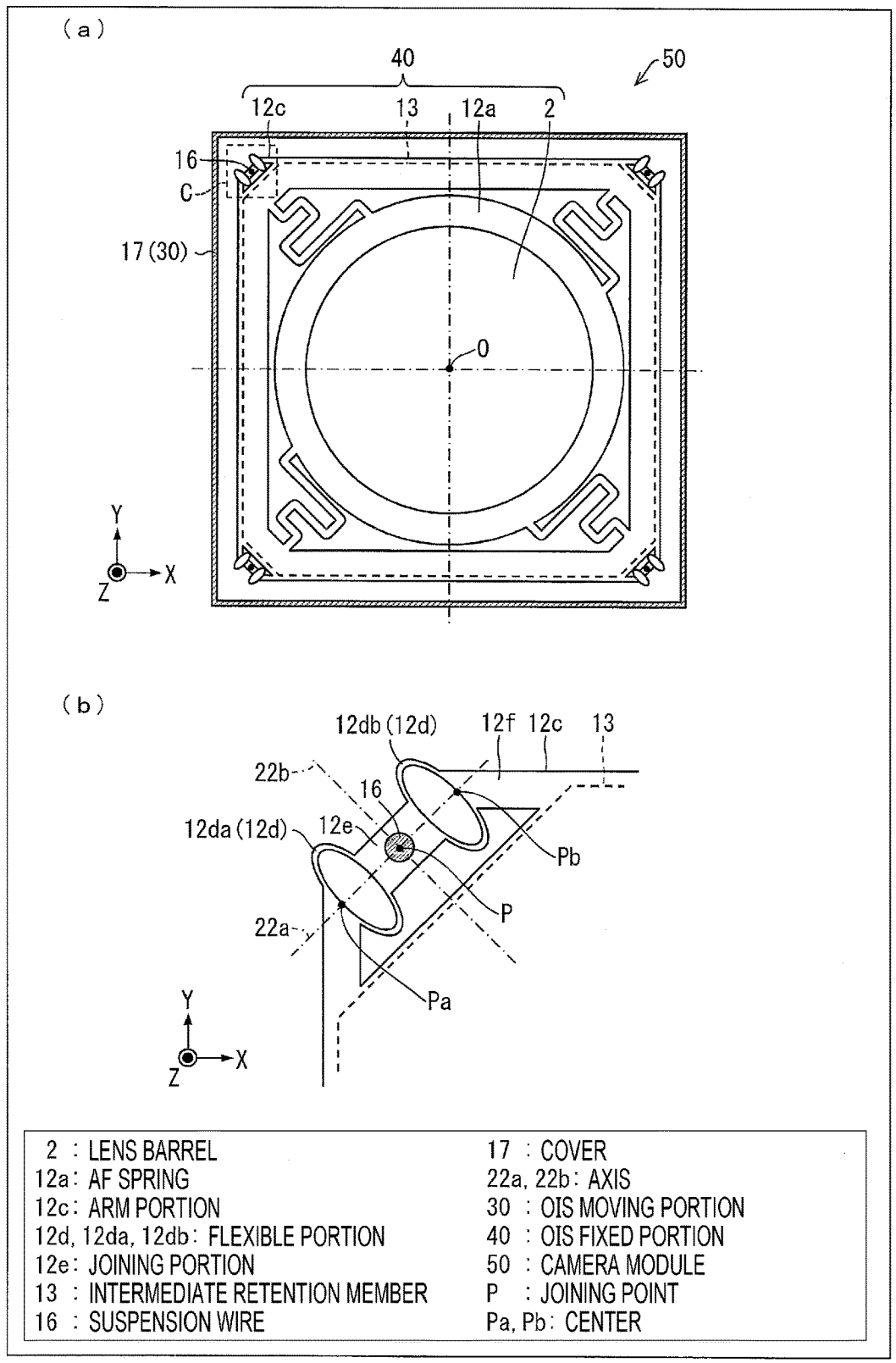
FIG. 3 is another cross-sectional view that illustrates configuration of the camera module illustrated in FIG. 1.

FIG. 3 is another cross-sectional view that illustrates configuration of the camera module 50 illustrated in FIG. 1. Additionally, FIG. 3(a) is a cross-sectional view taken along line B-B in FIG. 2. In addition, FIG. 3(b) is an enlarged view of a main portion C illustrated in FIG. 3(a).

Figure 4:
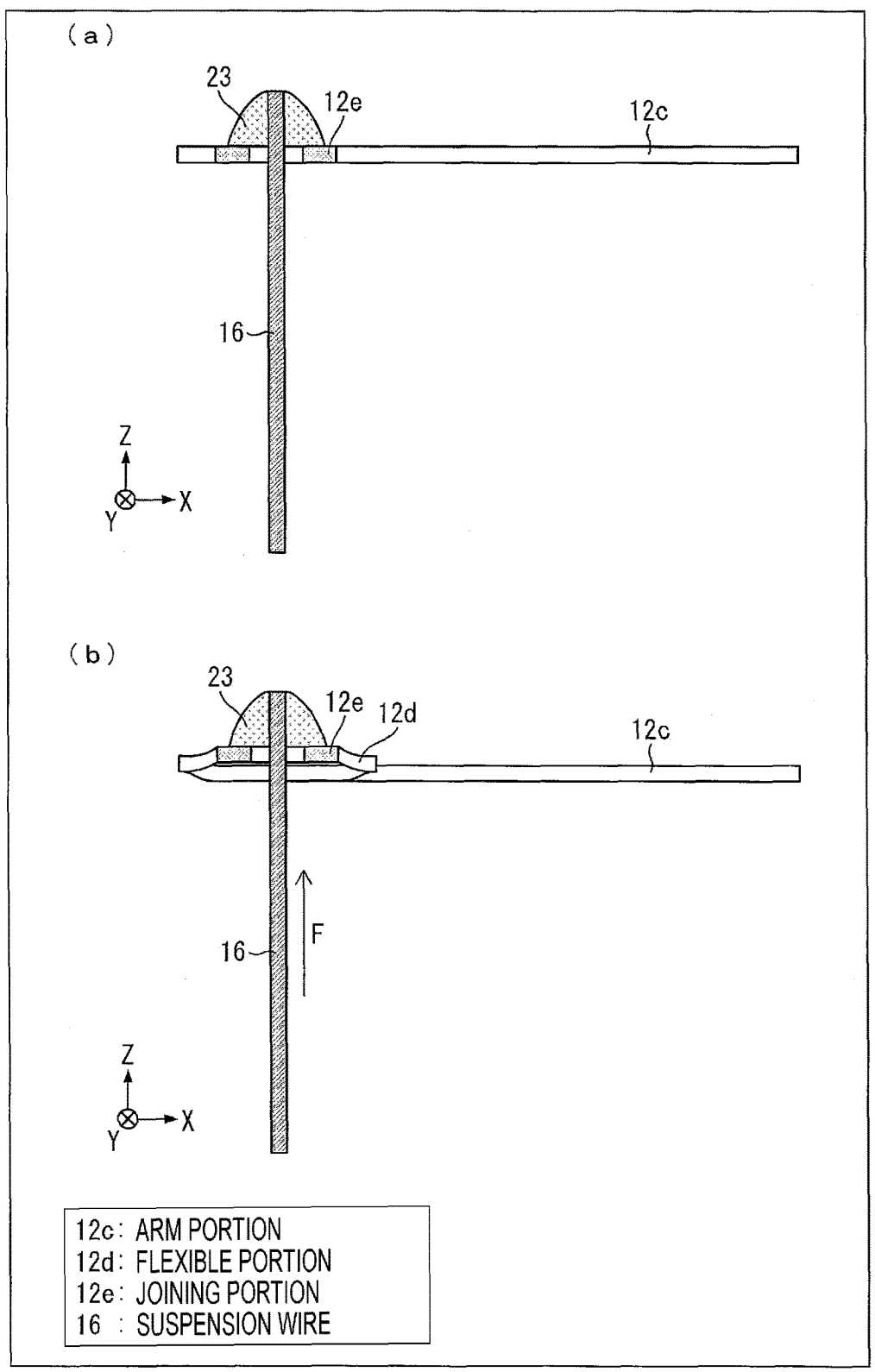
FIG. 4 is cross-sectional views that illustrate configurations that prevent a suspension wire in the camera module illustrated in FIG. 1 from fracturing.

FIG. 4 is cross-sectional views that illustrate configurations that prevent a suspension wire 16 of the camera module 50 illustrated in FIG. 1 from fracturing, (a) illustrates a state in which force is not applied to the suspension wire 16, and (b) illustrates a state in which force F is applied to the suspension wire 16 in a Z axis positive direction. In this instance, for example, the state illustrated in FIG. 4(a) is an initial state. In addition, for example, the state illustrated in FIG. 4(b) is a state in which the suspension wire 16 is urged upward in a Z axis positive direction by a drop impact, or the like.

(Camera Module)

As illustrated in FIG. 1 to FIG. 3, the camera module 50 includes an image capturing lens 1, a lens barrel 2 that accommodates the image capturing lens 1, and a lens holder 4 that fixes the lens barrel 2 to an inner portion using an adhesive 3.

In addition, the camera module 50 is provided with a lens driving device 5 for driving the image capturing lens 1 in an optical axis direction (a Z axis direction) and two axial directions (for example, X and Y axis directions) that are perpendicular to the optical axis, an image sensor 6 that performs photoelectric conversion of light that passes through the image capturing lens 1, a substrate 7 on which the image sensor 6 is mounted, a sensor cover 8 that covers the image sensor 6, and an image capturing portion 10 that is provided with a glass substrate 9. The lens driving device 5 and the image capturing portion 10 are laminated together in the optical axis direction. The lens driving device 5 is covered by a cover 17.

Additionally, hereinafter, for the sake of convenience, description will be given with an image capturing lens 1 side set as an upper side (the Z axis positive direction) and an image sensor 6 side set as a lower side (a Z axis negative direction), but this does not define the up-down direction during use, and, for example, the top and bottom may be reversed.

(Lens Driving Device)

The lens driving device 5 is provided with AF springs 12a and 12b, an intermediate retention member 13, an AF coil 14, a permanent magnet 15, the suspension wire 16, and Optical Image Stabilizer (OIS) coil 18, and a base 19.

The lens holder 4 is supported so as to be driven in the optical axis direction with respect to the intermediate retention member 13 by the two sheets of upper and lower AF springs (plate spring members) 12a and 12b. The AF coil 14 is fixed to the outer peripheral portion of the lens holder 4. The permanent magnet 15, in which a permanent magnet for AF driving and a permanent magnet for image stabilizing are standardized, is fixed to the intermediate retention member 13, but two permanent magnets may be provided separately. In addition, a projecting portion 4a of the lens holder 4 abuts against the intermediate retention member 13 at a mechanical end (a reference position on the image sensor 6 side of the movable range) on an infinite distance side in a movable range in the optical axis direction. Further, it is possible to drive the lens holder 4 (and the image capturing lens 1) in the optical axis direction by controlling the AF coil 14. As a result of this, it is possible to realize an automatic focus function.

In addition, the intermediate retention member 13 is supported by four of the suspension wires 16 with respect to the base 19, so as to be driven in two axial directions that are perpendicular to the optical axis direction. For example, the suspension wires 16 are long, thin metal wires, and extend in parallel with the optical axis. Additionally, the longitudinal direction of the suspension wires 16 and the optical axis direction need not coincide, and for example, the four suspension wires 16 may be disposed so as to be uniform, or slightly inclined. That is, the suspension wires 16 may extend diagonally with respect to the optical axis. In addition, the OIS coil 18 is fixed to the base 19 facing the lower surface of the permanent magnet 15. Further, by controlling the OIS coil 18, it is possible to drive the intermediate retention member 13, the permanent magnet 15, the AF springs 12a and 12b, the lens holder 4, the AF coil 14, the lens barrel 2, the image capturing lens 1, and the like, in an integral manner in directions that are perpendicular to the optical axis. As a result of this, it is possible to realize an image stabilizing function. Additionally, in normal image stabilizing, the lens, and the like are driven on the basis of a camera shake signal that is detected by a gyro sensor, or the like, but at this time, feedback control is performed by detecting a lens displacement amount. In the present embodiment, a hole element 21 is disposed in the vicinity of the OIS coil facing the permanent magnet 15, and it is possible to detect displacement of the permanent magnet 15 in directions that are perpendicular to the optical axis, that is, displacement of the image capturing lens 1. Since image stabilizing of two axes is performed, although not illustrated in the drawings, two hole elements are provided.

Additionally, in the present specification, a section that is driven in directions that are perpendicular to the optical axis of the image capturing lens 1 will be referred to as an OIS moving portion 30 (a moving portion), and sections other than this will be referred to as an OIS fixed portion 40 (a fixed portion). That is, the image capturing lens 1, the lens barrel 2, the lens holder 4, the AF springs 12a and 12b, the intermediate retention member 13 and the AF coil 14 are included in the OIS moving portion, and the cover 17, the OIS coil 18, the base 19 and the hole elements 21 are included in the OIS fixed portion.

(Disposition of Image Capturing Lens Etc.)

In the present embodiment, in a state in which the lens barrel 2 is fitted, a portion of the lens barrel 2 penetrates inside an opening 19a of the base 19. In general, since it is difficult to make a flange back (a distance from a lower end surface of the lens barrel 2 up to an image sensor 6 surface) of the image capturing lens 1 sufficiently large, there are many cases in which such a configuration is adopted. The lens driving device 5 is installed above the sensor cover 8.

The sensor cover 8 is mounted in a manner that covers the entire image sensor 6 and a reference surface, which is formed at a tip end of a projection 8a, abuts against the image sensor 6. An opening 8b is provided on the image capturing lens 1 side of the sensor cover 8, and the opening 8b is blocked by the glass substrate 9, which has an infrared ray cut-off function. The image sensor 6 is installed on the substrate 7, and the sensor cover 8 and the substrate 7 are adhered and fixed together in a state in which a gap between the sensor cover 8 and the substrate 7, which is caused by tolerance, is filled by an adhesive 20.

The lens barrel 2 and the lens holder 4 are fixed by the adhesive 3 such that the lens barrel 2 is positioned in a predetermined position in a state in which the lens holder 4 is positioned at the mechanical end on the infinite distance side. In addition, a gap of approximately 10 µm, for example, is formed between the lens barrel 2 and the sensor cover 8. In this manner, in order to determine the position of the lens barrel 2 in a state in which a gap of approximately 10 µm is formed, adhesion may be performed in a state in which the position of the lens barrel is maintained using a jig.

Next, an attachment position of the lens barrel 2 to the lens holder 4 will be described. It is desirable that the distance from the upper surface (a surface on a Z axis positive direction side) of the image sensor 6 be set such that position of the image capturing lens 1 is brought into focus at the mechanical end position on the infinite distance side. However, since there are tolerances such as the tolerance of the attachment position of the image capturing lens 1 to the lens barrel 2, and the tolerance of the thickness of the sensor cover 8, and variations for each member, there is a concern that there will be residual error in a case in which the positions are determined by mechanical contact (physical contact) without performing focus adjustment.

In such an instance, it is also preferable to attach the image capturing lens 1 to a position that is slightly closer to the image sensor 6 side than a center value in the design of the focal position in order to find a focal position within a stroke range of the lens driving device 5 even in a state in which there is such residual error. This shift amount will be referred to as over inflation. However, if the over inflation is set to be large, since the stroke of the lens driving device 5 also increases by an amount that is equivalent to the over inflation, it is necessary to secure as required lower limit for over inflation. When the various tolerances that are mentioned above are summed, for example, an over inflation amount of approximately 25 µm is appropriate, but since the value is influenced by manufacturing tolerances and assembly tolerances, it is desirable to set a value of a lower limit that fits reality.

Additionally, in the present embodiment, the reference surface on the lower side of the sensor cover 8 is caused to abut directly against the image sensor 6, and the position of the lens barrel 2 is determined with high accuracy with respect to the upper surface (the surface on the Z axis positive direction side) of the sensor cover 8 (or in other words, with respect to the lower surface (the surface on the Z axis negative direction side) of the lens driving device 5) using the sensor cover 8 in which the accuracy of the thickness is improved. Therefore, in the present embodiment, it can be said that an over inflation amount of approximately 25 µm is sufficient. In the present embodiment, the lens barrel 2 is attached to a position that is closer to the image sensor 6 side than the focal position with respect to an object at an infinite distance by an amount that is equivalent to 25 μm, and there is a gap between the sensor cover 8 and the lens barrel 2 in this state.

(Elastic Body)

As illustrated in FIG. 3(*a*), the characteristic feature in the present embodiment is a structure in which a portion of the upper side AF spring 12*a* protrudes (extends) further than the outer periphery of the intermediate retention member 13, an arm portion (an extended section) 12*c* is formed, and an upper end of the suspension wire 16 is fixed to a portion of the arm portion 12*c*, and which prevents the suspension wire 16 from becoming inclined as much as possible when the arm portion 12*c* becomes deformed. In addition, it is desirable for a relationship between the spring constant of the arm portion 12*c* and the spring constant in the longitudinal direction of the suspension wire 16 to be precisely defined such that permanent distortion in the longitudinal direction and buckling in a compaction direction of the suspension wire 16 do not occur. Additionally, the relationship between the two spring constants will be mentioned later. In addition, it is possible to suppress resonance peaks by providing a damper material 11 in a portion of the arm portion 12*c*.

Additionally, in the present specification, buckling refers to a phenomenon in which a wire folds over in a radial direction that is perpendicular to the longitudinal direction of the wire and it is not possible for the wire to be compressed any further in a case in which compression stress is applied to a wire-shaped member (metal). In addition, stress that causes buckling will be referred to as buckling stress.

Furthermore, in the present specification, permanent distortion refers to a phenomenon in which an extended wire does not return to the original state after stress has been relieved in a case in which a tensile stress is applied to a wire-shaped member. Additionally, stress in which the stress and the amount of deformation are no longer proportionate and that causes permanent distortion will be referred to as yield stress.

The detailed structure of the arm portion 12*c* will be described using FIG. 3(*b*). The arm portion 12*c* is a section in which the AF spring 12*a* extends further to an outer side than the intermediate retention member 13, and includes flexible portions 12*da* and 12*db* that have a flexible property, a joining portion 12*e* that is joined to the suspension wire 16, and fixed end portions 12*f*, the flexible properties of which are smaller than that of the flexible portions 12*d*. In the present embodiment, the flexible properties of the fixed end portions 12*f* are set to be relatively smaller than those of the flexible portions 12*da* and 12*db* by setting a greater spring width than that of the flexible portions 12*da* and 12*db*.

The fixed end portions 12*f* extend from two directions, and are joined together by the joining portion 12*e* via the flexible portion 12*da* (a first flexible portion) and the flexible portion 12*db* (a second flexible portion). In the following description, the term "flexible portion 12*d*" signifies either the flexible portion 12*da* or the flexible portion 12*db*.

The characteristic structure of the present application is the shape of the flexible portions 12*d* being linearly symmetric with respect to an axis 22*a* (a second axis) and an axis 22*b* (first axis), which pass through the center of the suspension wire 16 and are orthogonal to each other. As a result of setting a linearly symmetric structure in this manner, in a case in which the flexible portions 12*d* flex and become deformed, since the reactive force of a spring acts upon the joining portion 12*e* in a well-balanced manner, deformation in which the joining portion 12*e* are only slightly inclined is possible.

In the present embodiment, in order to realize this kind of linearly symmetric property, the fixed end portions 12*f* extend in an arm shape, boundary sections between the fixed end portions 12*f* and the flexible portions 12*d*, or in particular, since the widths of the fixed end portions 12*f* are great, a straight line that links substantially central positions of the boundaries of both fixed end portions, passes through the center of the suspension wire 16. In other words, a straight line that links a center Pa of a connection portion located between the flexible portion 12*da* and a fixed end portion 12*f*, and a center Pb of a connection portion located between the flexible portion 12*db* and a fixed end portion 12*f*, is the axis 22*a*. That is, the center of the above-mentioned boundary sections and the center of the suspension wire are aligned so as to be substantially in line with each other. If this straight line is set to be the axis 22*b* that acts as a reference for linear symmetry, the shape of the flexible portions is determined so as to have a linearly symmetric structure with respect to the respective axes 22*a* and 22*b*, in which the axis 22*a*, which passes through a joining point P, which is the center of the suspension wire, and is perpendicular to the axis 22*b*, is set. As a result of adopting such a structure, it is possible to easily obtain a symmetric property in a small space.

Additionally, in the above description, the term "linearly symmetric" signifies being linearly symmetric with respect to either the axis 22*a* or the axis 22*b* when viewed from a positive direction side of the Z axis as illustrated in FIG. 3(*b*). In other words, the term "linearly symmetric" can be interchanged with the description "plane-symmetric with respect to a plane that includes the axis 22*b* and is parallel to an optical axis O, and a plane that includes the axis 22*a* and is parallel to the optical axis O". The same applies below.

In addition, in the present embodiment, double-supported beams are configured as a result of the two flexible portions 12*d* being connected by the joining portion 12*e*, and the other ends of the flexible portions 12*d* being connected to the fixed end portions 12*f*. In the double-supported beam structure, if force acts upon the center thereof, and the spring constants of both sides are equivalent, inclination does not arise in a central portion.

Next, a state of deformation of the arm portion 12*c* illustrated in FIG. 4. FIG. 4(*a*) illustrates an initial state in which force is not applied in the longitudinal direction of the suspension wire, and (b) illustrates a deformed state at a time at which the suspension wire is being subjected to force in a direction that urges upward in the drawing due to a drop impact, or the like. The damper materials 11 are not illustrated in order to facilitate viewing. Meanwhile, solder 23 for joining the suspension wire 16 and the joining portion 12*e* is illustrated. As can be understood from FIG. 4(*b*), even in a case in which force is applied to the suspension wire and the flexible portions 12*d* become deformed, as a result of the symmetric property, displacement occurs without the joining portion 12*e* becoming inclined, the suspension wire 16 does not become inclined as a result of this, the application of shear stress is practically eliminated as a result of the stress of expansion and contraction being applied to the suspension wire 16, and for example, it is possible to reduce the risk of breaking as a result of exceeding the limits of yield stress and yield strength due to a drop impact or fatigue breaking due to repeated stress.

Next, an effect of joining the joining portion 12e and the fixed end portions 12f using the flexible portions 12d (that is, connecting the joining portion 12e and the fixed end portions 12f using the flexible portions 12d, and connecting the suspension wire 16 to the joining portion 12e) will be described. The flexible portions 12d function as elastic bodies for suppressing buckling and permanent distortion, fatigue, and the like, of the suspension wire 16. The arm portion 12c is not particularly limited, and for example, can be configured by a metal, a plastic, or the like. It is more preferable to use a material in which it is possible to sufficiently reduce the spring constant, and that does not become plastically deformed even if deformed by approximately 150 μm as the arm portion 12c. In addition, in a case of performing soldering of the arm portion 12c and the suspension wire 16, it is preferable that the arm portion 12c be configured by a metal. If potential use as an energizing means is taken into consideration, a material having a low electric resistance such as a copper alloy is desirable. When the number of parts is taken into consideration, it is desirable that the arm portion 12c be formed in an integral manner as a result of extending the upper side AF spring 12a further up to an outer side than the intermediate retention member 13. In the present embodiment, the upper side AF spring 12a and the arm portion 12c are the same material, and a copper alloy such as beryllium copper, nickel copper, or titanium copper, is suitable.

In a normal use state, the amount of deformation due to warping of the flexible portions 12d is of a level that can be disregarded, but in a case in which excessive impact force is applied due to a drop or the like, the OIS moving portion, including the intermediate retention member 13, is subjected to inertia force in the optical axis direction. Since the base 19 is present in a lower portion of the intermediate retention member 13, and the base 19 works as a stopper (a locking member) that defines a movement range of a lower side (the Z axis negative direction side) of the intermediate retention member 13 (the OIS moving portion) in the optical axis direction, it is possible to regulate displacement of the intermediate retention member 13 in the optical axis direction. However, taking assembly error, and the like, into consideration, in order to ensure that the OIS moving portion does not come into contact with the OIS fixed portion, it is essential to provide a gap of approximately 100 μm to 150 μm as a gap between the OIS moving portion and the OIS fixed portion. Therefore, it is conceivable for the interval between the OIS moving portion and the OIS fixed portion to change by approximately 150 μm. When an attempt is made to bear this amount of deformation using the expansion and contraction of the suspension wire 16 only, it is conceivable for the stress that is applied to the suspension wire 16 at this time to exceed the buckling stress or the yield stress.

In the same manner, the cover 17 may be made to act as a stopper with respect to movement of the intermediate retention member 13 on an upper side (the Z axis positive direction side) in the optical axis direction. For example, by providing a projecting portion, which is not illustrated in the drawings, on the upper side (the Z axis positive direction side) of the intermediate retention member 13, it is also possible to set the movement range on the upper side (the Z axis positive direction side) to be equivalent to the movement range of on the lower side (the Z axis negative direction side) of approximately 150 μm.

In the present embodiment, since the flexible portions 12d bear a portion of the amount of deformation, it is possible to suppress the amount of deformation of the suspension wire 16 in the longitudinal direction.

Figure 5:
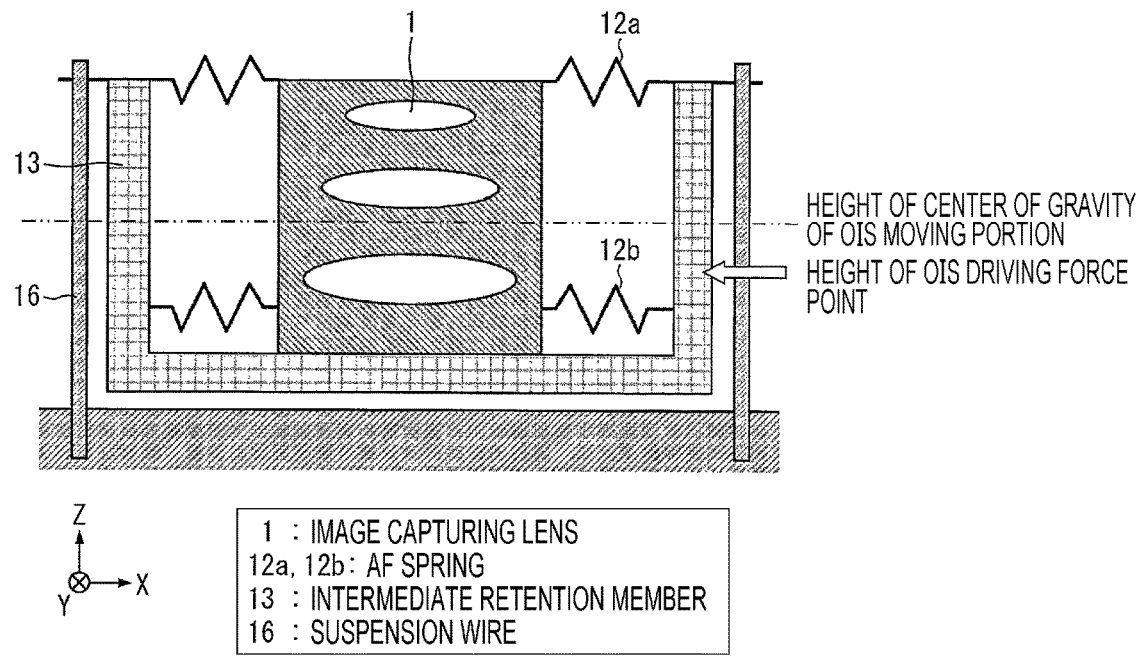
FIG. 5 is a schematic view that illustrates a configuration of the camera module illustrated in FIG. 1.

FIG. 5 is a schematic view that illustrates a configuration of the camera module 50 illustrated in FIG. 1. FIG. 5 is obtained by simplifying the important component parts of the present invention only. The lens holder 4, which maintains the image capturing lens 1, and the like, is supported by the two upper and lower AF springs 12a and 12b, and a portion of the upper side AF spring 12a protrudes further on the outer side than the intermediate retention member 13. A portion of this protruding arm portion 12c is fixed to the suspension wire 16.

(Spring Constants)

Figure 6:
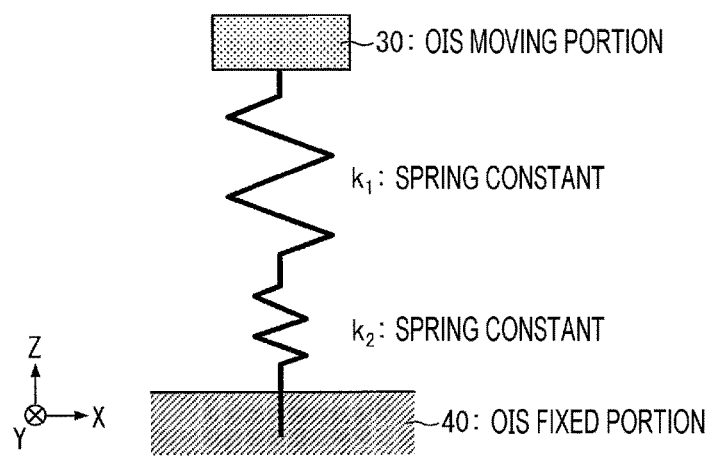
FIG. 6 is another schematic view that illustrates a configuration of the camera module illustrated in FIG. 1.

Next, a drop resistance property of the camera module 50 according to an embodiment of the present invention will be described in more detail. A relationship between the spring constants of the suspension wire 16 and the flexible portions 12d illustrated in FIG. 6. FIG. 6 is another schematic view that illustrates a configuration of the camera module illustrated in FIG. 1, and is a view that illustrates the spring configurations of the flexible portions 12d and the longitudinal direction of the suspension wire 16 in a simplified form. $k_1$ is the spring constant of the flexible portions 12d at the arm portion 12c that extend from the upper side (the Z axis positive direction side) AF spring 12a, and $k_2$ is the spring constant in the longitudinal direction of the suspension wire 16. That is, a structure in which the two springs of $k_1$ and $k_2$ are connected in series. Additionally, in a case in which a portion of the arm portion 12c is coated with the damper material 11, $k_1$ corresponds to the spring constant of the arm portion 12c including the damper material. In order to simplify the explanation, description will be given relating to a suspension wire 16 of a single portion.

In the above-mentioned structure, it is set such that $k_1 \ll k_2$. For example, it is set such that $k_1$=approximately $1 \times 10^3$ N/m, and $k_2$=approximately $1 \times 10^5$ N/m. If the total amount of deformation (the movable distance of the moving portion 30) that occurs due to a drop impact, or the like, is set as δ (for example, approximately 150 μm, which is the interval between the intermediate retention member 13 and the base 19), the respective amounts of deformation of the springs are inversely proportionate to the respective spring constants, and are determined in the manner of Formulae (1) and (2) below.

$$\text{Amount of deformation } \delta_1 \text{ of elastic body(arm portion } 12c) = \delta k_2/(k_1+k_2) = 148.5 \text{ μm} \quad (1)$$

$$\text{Amount of deformation } \delta_2 \text{ of suspension wire } 16 = \delta k_1/(k_1+k_2) = 1.5 \text{ μm} \quad (2)$$

In addition, force F that is required in order to deform the suspension wire 16 by an amount that is equivalent to $\delta_2$ is determined in the manner of Formula (3) below.

$$F = \delta k_1 k_2/(k_1+k_2) = 0.15 \text{ N} \quad (3)$$

In this instance, the cross-sectional area of the suspension wire 16 is set as $5 \times 10^{-9}$ m². At this time, if the cross-sectional area of the suspension wire 16 is set as A, the stress that is defined by the amount of deformation in the longitudinal direction of the suspension wire 16 is determined in the manner of Formula (4) below.

$$\sigma = (\delta/A) k_1 k_2/(k_1+k_2) = 3 \times 10^7 \text{ N/m}^2 \quad (4)$$

It is essential that this σ does not exceed the buckling stress $\sigma_e$ of the suspension wire 16. That is, the reason why the buckling stress is of concern is that the buckling stress is smaller than the yield stress in normal cases.

That is, it is sufficient as long as the amount of deformation δ, for which the movement range is set as the upper limit, the cross-sectional area A, and the spring constant $k_1$ and spring constant $k_2$ are set so as to satisfy Formula (5) below.

$$\sigma_e > (\delta/A) k_1 k_2 /(k_1 + k_2) \quad (5)$$

Additionally, as the buckling stress, Euler buckling stress is normally used as a target. Euler buckling stress is represented by Formula (6) below. C is a constant, and C=4 in a case of a double end fixed beam. E is the Young's modulus of the suspension wire 16, λ respectively illustrates the slenderness ratios of the suspension wires 16.

$$\sigma_e = C\pi^2 E/\lambda^2 \quad (6)$$

If Euler buckling stress is calculated on the basis of a single design example, the Euler buckling stress has a value of approximately $1 \times 10^8$ N/m². However, Euler buckling stress is a formula of a case in which a physical vertical load is applied, whereas in practice, a load is applied diagonally, and therefore, it is desirable to set the buckling stress allowing for a given margin. Additionally, a manufacturing method that includes the above-mentioned design and calculation processes is also included in the present invention.

In the present embodiment, the movement range of the intermediate retention member 13 (the OIS moving portion) in the optical axis direction is defined as a result of the base 19 working as a stopper (a locking member). This movement range is distributed between the amount of deformation in the longitudinal direction of the suspension wire 16, and the amount of deformation of the flexible portions 12d at a proportion that corresponds to the respective spring constants. Further, it is possible to prevent buckling and permanent distortion due to the stress that is caused by the amount of deformation that the longitudinal direction of the suspension wire 16 is subjected to, not exceeding the buckling stress and the yield stress of the suspension wire 16, and therefore, it is possible to provide a drop resistance property in the camera module 50.

Second Embodiment

The second embodiment differs from the first embodiment in that the arm portion 12c, and in particular, the shape of the flexible portions 12d is different. FIG. 7(a) is a view that illustrates a configuration that prevents the suspension wire 16 in the camera module 50 of the present embodiment from fracturing, corresponds to FIG. 3(b), and is an enlarged view of the vicinity of the of a connection portion of the suspension wire 16 and the arm portion 12c, which is on an outer side of the AF spring in the camera module 50. Additionally, the same member numbers are given to the same members as those of the first embodiment, and detailed description thereof will be omitted.

Figure 7:
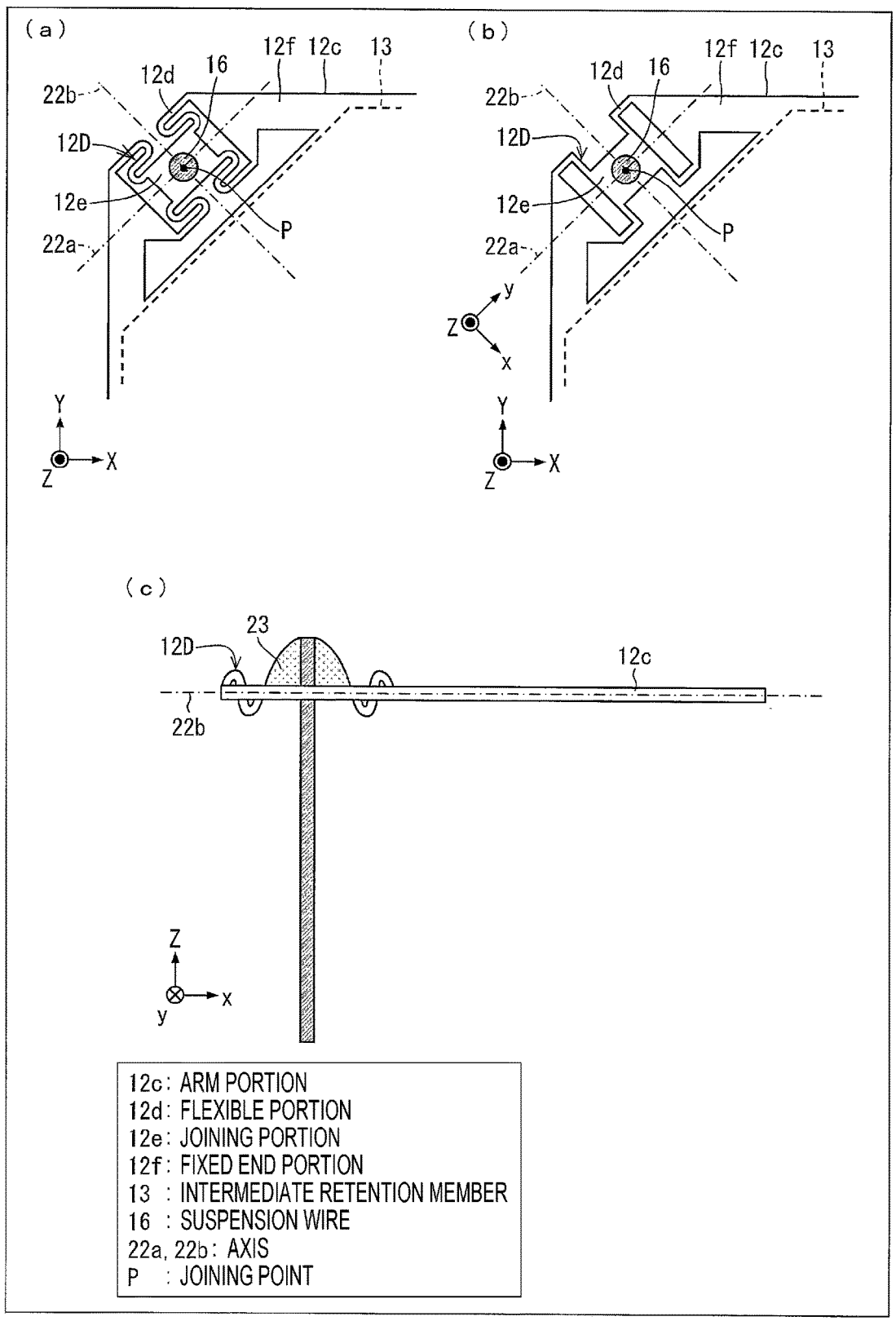
FIG. 7 is a diagram illustrating configurations that prevent a suspension wire in a camera module of a second embodiment of the present invention from fracturing, and correspond to FIG. 3(b).

As illustrated in FIG. 7, in the second embodiment, the shape of the flexible portions 12d is a shape that includes meander portions 12D. In contrast to the first embodiment having ring-shaped flexible portions, as a result of setting a meander structure in the manner of the second embodiment, it is possible to increase the effective length of the flexible portions 12d, and therefore, it is easier to appropriately adjust the spring constant of the flexible portions 12d.

The fundamental effect is the same as that of the first embodiment. That is, the fixed end portions 12f and the joining portion 12e are connected using the flexible portions 12d, and the suspension wire 16 is joined to the joining portion 12e. The shape of the flexible portions 12d is linearly symmetric with respect to the two respective axes 22a and 22b that pass through the center of the suspension wire 16. In addition, the four flexible portions 12d form a double-supported beam using the joining portion 12e. As a result of adopting this kind of configuration, even in a case in which the flexible portions 12d become deformed, deformation occurs without the joining portion 12e becoming inclined, and therefore, the suspension wire 16 does not become inclined and it is possible to reduce the shear stress that is applied to the suspension wire.

Modification Examples

FIGS. 7(b) and 7(c) are views that illustrate modification examples of the configuration that prevent the suspension wire 16 illustrated in FIG. 7(a) from fracturing. FIG. 7(c) is a side view with respect to FIG. 7(b) when the shape of the meander portions 12D of the flexible portions 12d illustrated in FIG. 7(b) is viewed from a side surface side (a y axis direction side) with respect to a direction (a direction in Zx plane) in which the meander portions 12D extend.

As illustrated in FIG. 7(a), the meander portions 12D are not limited to a shape that extends on an XY plane. For example, as illustrated in FIGS. 7(b) and 7(c), a shape that extends on the Zx plane may be used. Additionally, an xyZ coordinate system axis is a coordinate system axis in which the XYZ axes are rotated with the Z axis serving as the center axis, an x axis is parallel to the axis 22b, and a y axis is parallel to the axis 22a.

Further, the meander portion 12D illustrated in FIGS. 7(b) and 7(c) corresponds to four meander portions 12D illustrated in FIG. 7(a), and has a shape on a plane that differs from that of the corresponding meander portions 12D.

Since the entirety of the flexible portions 12d of the meander portions 12D illustrated in FIG. 7(a) are included in a single XY plane, the workability is superior to that of the meander portions 12D illustrated in FIGS. 7(b) and 7(c). Additionally, the meander portions 12D of a case in which the entirety of the flexible portions 12d are not included in a single plane such as that illustrated in FIGS. 7(b) and 7(c), may be stereoscopically molded by a 3D printer (a three-dimensional printer), or the like.

In other words, as long as the shape of the flexible portions 12d is respectively linearly symmetric (plane-symmetric in the above-mentioned manner) with respect to the two axes 22a and 22b that pass through the center of the suspension wire 16 and are orthogonal to each other, the meander portions 12D of the flexible portions 12d may extend in a spatial manner. According to the above-mentioned configuration, it is possible to further increase the effective length of the flexible portions 12d, and therefore, the spring constant of the flexible portions 12d is more appropriately adjusted.

Third Embodiment

Figure 8:
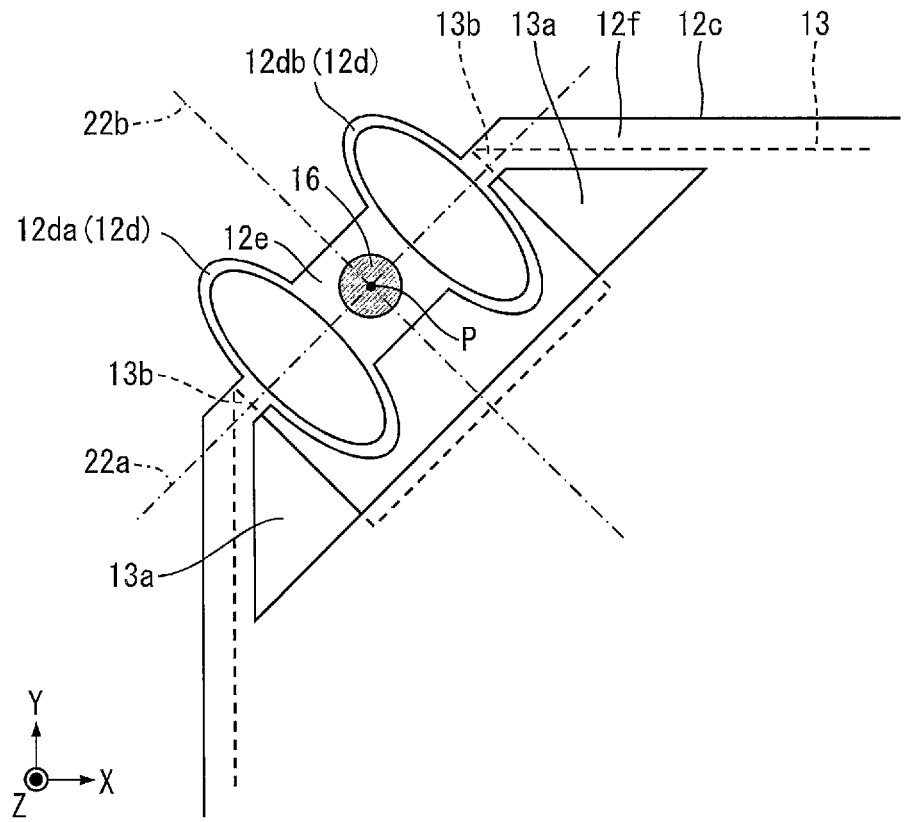
FIG. 8 is a view that illustrates a configuration that prevents a suspension wire in a camera module of a third embodiment of the present invention from fracturing, and corresponds to FIG. 3(b).

The third embodiment differs from the first embodiment in that the boundary sections of the fixed end portions 12f and the flexible portions 12d are formed by a boundary edge of the intermediate retention member 13. FIG. 8 is a view that illustrates a configuration that prevents the suspension wire 16 in the camera module 50 of the present embodiment from fracturing, corresponds to FIG. 3(b), and is an enlarged view of the vicinity of the of a connection portion of the suspension wire 16 and the arm portion 12c, which is on an outer side of the AF spring in the camera module 50. Additionally, the same member numbers are given to the same members as those of the first embodiment, and detailed description thereof will be omitted.

As illustrated in FIG. 8, in the second embodiment, a portion of the intermediate retention member 13 includes protruding portions 13a, which protrude, and the boundaries between the flexible portions 12d and the fixed end portions 12f are set by boundary edge portions 13b (translation suppression portions) of the protruding portions 13a. In other words, the moving portion 30 may include the boundary edge portions 13b, which suppress translatory motion in a direction in which the optical axis O of the connection portion located between the flexible portions 12d and the moving portion 30 extends.

In this instance, the fixed end portions 12f are fixed to the intermediate retention member 13. It is not necessary for the fixed end portions 12f to become warped, and in increasing the width of the spring in the manner of Embodiment 1, although the flexible property is relatively small in comparison with the flexible portions 12d, a certain amount of flexing occurs. As a result of fixing the fixed end portions 12f to the intermediate retention member 13 in the manner of the present embodiment, the fixed end portions 12f are only slightly deformed. When the fixed end portions 12f are deformed in the shape of Embodiment 1, since an asymmetric property with respect to the lines 22a and 22b is brought about, it is desirable for the fixed end portions 12f not to become deformed. The fundamental effect is the same as that of the first embodiment. That is, the fixed end portions 12f and the joining portion 12e are connected using the flexible portions 12d, and the suspension wire 16 is joined to the joining portion 12e. The shape of the flexible portions 12d is linearly symmetric with respect to the two respective axes 22a and 22b that pass through the center of the suspension wire 16. In addition, the two ring-shaped flexible portions 12d form a double-supported beam using the joining portion 12e. As a result of adopting this kind of configuration, even in a case in which the flexible portions 12d become deformed, deformation occurs without the joining portion 12e becoming inclined, and therefore, the suspension wire 16 does not become inclined and it is possible to reduce the shear stress that is applied to the suspension wire.

Fourth Embodiment

A fourth embodiment of the present invention is described on the basis of FIG. 9 in the following manner. Additionally, for convenience of description, the same reference symbols will be given to members that have the same functions as the members that are described in the above-mentioned embodiments, and description thereof will be omitted.

(Relationship Between Impact Applied to Base and Inclination of Joining Portion)

In this instance, in the above-mentioned manner, since one end of the suspension wire 16 is fixed to the base 19 (the fixed portion), when an impact is applied to the base 19, the one end moves in accordance with the corresponding impact.

Meanwhile, another end of the suspension wire 16 is joined to the joining portion 12e, and the joining portion 12e is connected to the fixed end portions 12f via the flexible portions 12d. Further, even if an impact is applied to the base 19, the fixed end portions 12f do not move in accordance with the corresponding impact. Accordingly, although capable of moving to a certain extent, it is difficult for the other end of the suspension wire 16 to move in accordance with an impact due to deformation of the flexible portions 12d and the joining portion 12e.

In other words, since it is relatively easier for one end of the suspension wire 16 to move with respect to the other end of the suspension wire 16, when an impact is applied to the base 19, there are cases in which the suspension wire 16 bends, and the joining portion 12e becomes inclined. In other words, force that causes the joining portion 12e to become inclined (that causes rotational motion) is applied to the joining point P of the suspension wire 16 and the joining portion 12e.

(Configuration for Preventing Inclination of Joining Portion)

Figure 9:
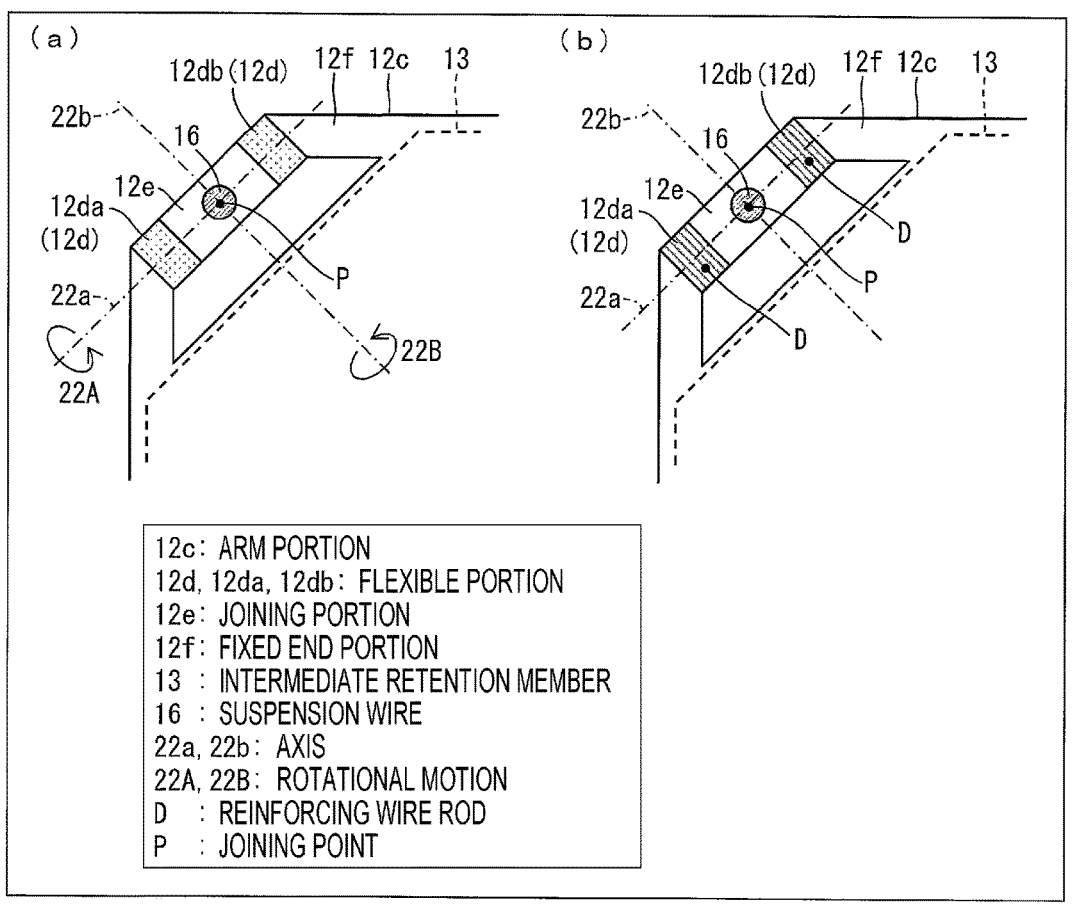
FIG. 9 is a diagram illustrating configurations that prevent a suspension wire in a camera module of a fourth embodiment of the present invention from fracturing, and correspond to FIG. 3(b).
Figure 10:
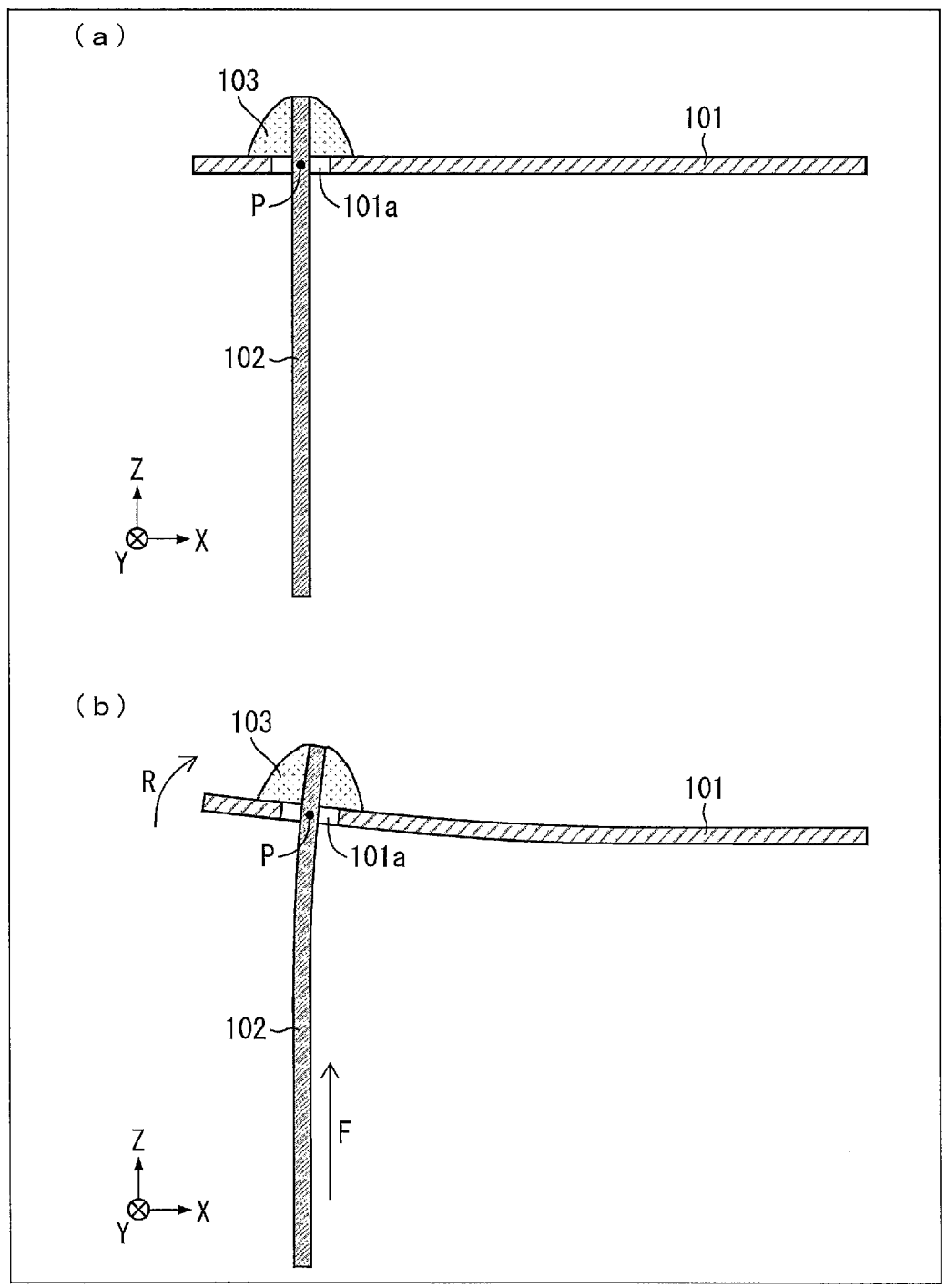
FIG. 10 is a diagram illustrating cross-sectional views of a fracture prevention member using a suspension wire of a camera module used in the related art.

FIG. 9 is a diagram illustrating configurations that prevent the suspension wire 16 in the camera module 50 of the present embodiment from fracturing, correspond to FIG. 3(b), (a) is a schematic view that illustrates the corresponding configuration, and (b) is a view that illustrates the corresponding configuration that is realized by a reinforcing wire rod.

As illustrated in FIG. 9(a), the configuration that prevents the suspension wire 16 in the camera module 50 from fracturing is a configuration in which the flexible portions 12d suppress rotational motion 22B of the joining portion 12e with the axis 22b serving as the center axis, and rotational motion 22A of the joining portion 12e with the axis 22a serving as the center axis, and connect the joining portion 12e and the fixed end portions 12f.

According to the above-mentioned configuration, since the flexible portions 12d suppress rotational motion of the joining portion 12e with the two axes of the axes 22a and 22b, which are orthogonal to each other, serving as the center axes, the joining portion 12e does not become inclined, and, for example, shear force does not act upon the suspension wire 16.

According to the above-mentioned configuration, it is difficult for the suspension wire 16 to break due to an impact (for example, rapid movement of the camera module as a result of being dropped). That is, it is possible to reduce the risk of fracturing of the suspension wire 16.

(Specific Examples of Joining Portion)

The flexible portions 12d can be realized in the manner that is set forth in the above-mentioned embodiments, but may also be realized in the following manner.

As illustrated in FIG. 9(b), the flexible portions 12d may include an elastic body (rubber, or the like), and a reinforcing wire rods D, in which the elastic modulus is higher than that of the elastic body, and which are provided in parallel with the axis 22b.

According to the above-mentioned configuration, in comparison with a case in which the reinforcing wire rods D are not included, a flexible property is retained and it is difficult for the flexible portions 12d to become twisted in a direction of rotation with the axis 22a serving as the center axis, and in a direction of rotation with the axis 22b serving as the center axis. In addition, since the reinforcing wire rods D are provided in parallel with the axis 22b, the reinforcing wire rods D do not hinder elongation of the elastic body in the axis 22a direction, which is perpendicular to the axis 22b. Accordingly, it is more difficult for the joining portion 12e to become inclined.

Additionally, in a case in which the flexible portions 12d do not include an elastic body such as rubber, and are metal, for example, it is preferable that the shape of the flexible portions 12d be a shape that flexes easily in the axis 22a direction such as the ring-shape illustrated in FIGS. 3(a) and 3(b), or the shape that includes the meander portions illustrated in FIGS. 7(a) to 7(c). As a result of this, the spring constant (the elastic modulus) of the flexible portions 12d is low, and it is possible for the flexible portions 12d to become elongated in the axis 22a direction. In other words, it is possible for the joining portion 12e to become displaced matching translatory motion of the suspension wire 16.

[Summary]

According to Aspect 1 of the present invention, there is provided a camera module that has an image stabilizing function, the camera module including: a moving portion 30 that includes an image capturing lens 1; a fixed portion 40 that surrounds the moving portion; a suspension wire 16 that extends in parallel with or diagonally with respect to an optical axis O of the image capturing lens, that supports the moving portion such that the moving portion moves in a direction that is perpendicular to the optical axis, and in which one end is fixed to the fixed portion; a joining portion 12e to which another end of the suspension wire is fixed; and flexible portions 12d, 12da and 12db that suppress rotational motion 22B of the joining portion with a first axis (the axis 22b) serving as the center axis, which passes through a joining point P of the suspension wire and the joining portion and is orthogonal to the optical axis; and rotational motion 22A of the joining portion with a second axis (the axis 22a) serving as the center axis, which passes through the joining point and is orthogonal to the first axis, and that connect the joining portion and the moving portion.

In this instance, in the above-mentioned manner, since one end of the suspension wire is fixed to the fixed portion, when an impact is applied to the fixed portion, the one end moves in accordance with the corresponding impact.

Meanwhile, the other end of the suspension wire is joined to the joining portion, and the joining portion is connected to the moving portion via the flexible portions. Further, even if an impact is applied to the fixed portion, the moving portion does not move in accordance with the corresponding impact. Accordingly, although capable of moving to a certain extent, it is difficult for the other end of the suspension wire to move in accordance with an impact due to deformation of the flexible portions and the joining portion.

In other words, since it is relatively easier for one end of the suspension wire to move with respect to the other end of the suspension wire, when an impact is applied to the fixed portion, there are cases in which the suspension wire bends, and the joining portion becomes inclined. In other words, force that causes rotational motion of the joining portion is applied to the joining point of the suspension wire and the joining portion.

According to the above-mentioned configuration, since the flexible portions suppress rotational motion of the joining portion with the two axes of the first axis and the second axis, which are orthogonal to each other, serving as the center axes, the joining portion does not become inclined, and, for example, shear force does not act upon the suspension wire.

According to the above-mentioned configuration, it is difficult for the suspension wire to break due to an impact (for example, rapid movement of the camera module as a result of being dropped). That is, it is possible to reduce the risk of fracturing of the suspension wire.

In a camera module according to Aspect 2 of the present invention, in the above-mentioned Aspect 1, the shape of the flexible portion may be plane-symmetric with respect to a plane that includes the first axis and is parallel to the optical axis, and a plane that includes the second axis and is parallel to the optical axis.

According to the above-mentioned configuration, the shape of the flexible portion is plane-symmetric with respect to a plane that includes two axes that pass through the joining point and are orthogonal to each other. Therefore, since the flexible portion is deformed in a symmetric manner with respect to the joining point, the joining portion tilts (becomes inclined) slightly. Accordingly, since only force in an expansion and contraction direction is applied to the suspension wire, very small shear force (shear stress) is applied. Therefore, it is more difficult for the suspension wire to break.

In a camera module according to Aspect 3 of the present invention, in the above-mentioned Aspect 1 or 2, at least one pair of the above-mentioned flexible portions is provided, one end of the joining portion is connected to the moving portion by the first flexible portion 12da, the other end of the joining portion is connected to the moving portion by the second flexible portion 12db, and a straight line that links a center Pa of a connection portion located between the first flexible portion and the moving portion and a center Pb of a connection portion located between the second flexible portion and the moving portion may be the second axis.

According to the above-mentioned configuration, the center of each boundary section and the center (the joining point) of the suspension wire are provided so as to be substantially in line with each other. Further, since the flexible portion is also provided in a symmetric manner with respect to the straight line, it is possible to reduce tilt (inclination) of the joining portion during deformation of the flexible portion, and therefore, it is possible to further reduce the risk of fracturing of the suspension wire.

In a camera module according to Aspect 4 of the present invention, in any one of the above-mentioned Aspects 1 to 3, the elastic modulus of the connection portion located between the flexible portion and the moving portion and the elastic modulus of the flexible portion are different.

According to the above-mentioned configuration, since the elastic modulus of the flexible portion is set to be comparatively small, and there is a margin for causing the flexible outer to become greatly deformed, it is possible to set deformation of the suspension wire to be relatively small.

In a camera module according to Aspect 5 of the present invention, in the above-mentioned Aspect 4, the flexible portion may have a ring shape that connects the joining portion and the moving portion.

According to the above-mentioned configuration, it is possible to realize the flexible portion using a simple ring shape.

In a camera module according to Aspect 6 of the present invention, in the above-mentioned Aspect 4, the flexible portion may have a meander shape that connects the joining portion and the moving portion.

In this instance, as long as the same material, the same thickness and the same width are used, the spring constant is inversely proportionate to the cube of the effective length of the spring.

According to the above-mentioned configuration, it is possible to increase the effective length of the flexible portion, and therefore, it is easier to appropriately adjust the spring constant of the flexible portion. In other words, it is possible to further reduce the spring constant of the flexible portion while retaining the dimensions of the entire flexible portion at a fixed size or less.

In a camera module according to Aspect 7 of the present invention, in any one of the above-mentioned Aspects 1 to 6, the moving portion may include a translation suppression portion (the boundary edge portion 13b), which suppresses translatory motion of the connection portion located between the flexible portion and the moving portion in a direction in which the optical axis extends.

According to the above-mentioned configuration, the structure that is formed from the joining portion and the flexible portion corresponds to a double-supported beam in which both ends of the corresponding portion are substantially fixed by translation suppression portions. As a result of this, it is more difficult for the joining portion to become inclined.

In a camera module according to Aspect 8 of the present invention, in any one of the above-mentioned Aspects 1 to 7, the flexible portion may include an elastic body, and the reinforcing wire rod D, in which the elastic modulus is higher than that of the elastic body, and which is provided in parallel with the first axis.

According to the above-mentioned configuration, in comparison with a case in which the reinforcing wire rod is not included, a flexible property is retained and it is difficult for the flexible portion to become twisted in a direction of rotation with the first axis serving as the center axis, and in a direction of rotation with the second axis serving as the center axis. In addition, since the reinforcing wire rod D is provided in parallel with the first axis, the reinforcing wire rod D does not hinder elongation of the elastic body in the second axis direction, which is perpendicular to the first axis. Accordingly, it is more difficult for the joining portion to become inclined.

According to Aspect 9 of the present invention, there is provided a method for manufacturing a camera module that is provided with the moving portion 30 that includes an image capturing lens, a fixed portion that surrounds the moving portion, a suspension wire that extends in parallel with or diagonally with respect to an optical axis of the image capturing lens, that supports the moving portion such that the moving portion moves in a direction that is perpendicular to the optical axis, and in which one end is fixed to the fixed portion, and a joining portion to which another end of the suspension wire is fixed, and has an image stabilizing function, the manufacturing method including: designing a flexible portion by calculating the elastic modulus of the flexible portion such that stress, which is determined on the basis of a movable distance of the moving portion, a cross-sectional area and spring constant of the suspension wire, and a spring constant of the flexible portion, is less than buckling stress of the suspension wire; and connecting the joining portion and the moving portion such that the flexible portion suppresses; rotational motion of the joining portion with a first axis serving as the center axis, which passes through a joining point of the suspension wire and the joining portion and is orthogonal to the optical axis; and rotational motion of the joining portion with a second axis serving as the center axis, which passes through the joining point and is orthogonal to the first axis.

According to the above-mentioned configuration, it is possible to manufacture a camera module in which the risk of fracturing of the suspension wire is low.

[Supplementary Information]

The present invention is not limited to each of the embodiments mentioned above, various modifications are possible within a range that is illustrated in the claims, and embodiments obtained by combining technical means that are respectively described in different embodiments as appropriate, are also included in the technical scope of the present invention. Furthermore, it is possible to form new technical features by combining technical means that are respectively described in each embodiment.

INDUSTRIAL APPLICABILITY

The present invention can be used in a manufacturing field of camera modules, and in particular, can be suitably used in a manufacturing field of camera modules that are installed in various items of electrical equipment including communication equipment such as portable remote terminals.

REFERENCE SIGNS LIST

1 IMAGE CAPTURING LENS
2 LENS BARREL (MOVING PORTION)
3 ADHESIVE (MOVING PORTION)
4 LENS HOLDER (MOVING PORTION)
5 LENS DRIVING DEVICE (MOVING PORTION)
12$a$ AF SPRING (MOVING PORTION)
12$b$ AF SPRING (MOVING PORTION)
12$c$ ARM PORTION (MOVING PORTION)
12$d$ FLEXIBLE PORTION (ROTATION SUPPRESSION PORTION)
12$da$ FLEXIBLE PORTION (ROTATION SUPPRESSION PORTION)
12$db$ FLEXIBLE PORTION (ROTATION SUPPRESSION PORTION)
12$e$ JOINING PORTION
12$f$ FIXED END PORTION (MOVING PORTION)
13 INTERMEDIATE RETENTION MEMBER (MOVING PORTION)
13$a$ PROTRUDING PORTION (MOVING PORTION)
13$b$ BOUNDARY EDGE PORTION (TRANSLATION SUPPRESSION PORTION)
14 AF COIL (MOVING PORTION)
15 PERMANENT MAGNET (MOVING PORTION)
16 SUSPENSION WIRE
17 COVER (FIXED PORTION)
18 OIS COIL (FIXED PORTION)
19 BASE (FIXED PORTION)
21 HOLE ELEMENT (FIXED PORTION)
22A ROTATIONAL MOTION (INCLINATION)
22B ROTATIONAL MOTION (INCLINATION)
22$a$ AXIS (SECOND AXIS)
22$b$ AXIS (FIRST AXIS)
30 OIS MOVING PORTION (MOVING PORTION)
40 OIS FIXED PORTION (FIXED PORTION)
50 CAMERA MODULE
D REINFORCING WIRE ROD
P JOINING POINT
Pa CENTER
Pb CENTER
$k_1$ SPRING CONSTANT
$k_2$ SPRING CONSTANT
σ STRESS
$σ_e$ BUCKLING STRESS

The invention claimed is:

1. A camera module that has an image stabilizing function, the camera module comprising:
a moving portion that includes an image capturing lens;
a fixed portion that surrounds the moving portion;
a suspension wire that extends in parallel with or diagonally with respect to an optical axis of the image capturing lens, that supports the moving portion such that the moving portion moves in a direction that is perpendicular to the optical axis, and in which one end is fixed to the fixed portion;

a joining portion to which another end of the suspension wire is fixed; and a flexible portion that suppresses: inclination of the joining portion with a first axis serving as the center axis, which passes through a joining point of the suspension wire and the joining portion and is orthogonal to the optical axis; and inclination of the joining portion with a second axis serving as the center axis, which passes through the joining point and is orthogonal to each of the optical axis and the first axis, and that connects the joining portion and the moving portion, wherein the flexible portion includes a first flexible portion and a second flexible portion which are separate from each other and which are connected by the joining portion, and a shape of the flexible portion is plane-symmetric with respect to a plane that includes the first axis and is parallel to the optical axis, and a plane that includes the second axis and is parallel to the optical axis.

2. The camera module according to claim 1, wherein an elastic modulus of a connection portion located between the flexible portion and the moving portion, and an elastic modulus of the flexible portion are different.

3. The camera module according to claim 2, wherein the flexible portion located between the joining portion and the moving portion has a meander shape.

4. A method for manufacturing a camera module that is provided with a moving portion that includes an image capturing lens, a fixed portion that surrounds the moving portion, a suspension wire that extends in parallel with or diagonally with respect to an optical axis of the image capturing lens, that supports the moving portion such that the moving portion moves in a direction that is perpendicular to the optical axis, and in which one end is fixed to the fixed portion, and a joining portion to which another end of the suspension wire is fixed, and has an image stabilizing function, the manufacturing method comprising:

designing a flexible portion by calculating the elastic modulus of the flexible portion such that stress, which is determined on the basis of a movable distance of the moving portion, a cross-sectional area and spring constant of the suspension wire, and a spring constant of the flexible portion, is less than buckling stress of the suspension wire; and connecting the joining portion and the moving portion such that the flexible portion suppresses: inclination of the joining portion with a first axis serving as the center axis, which passes through a joining point of the suspension wire and the joining portion and is orthogonal to the optical axis; and inclination of the joining portion with a second axis serving as the center axis, which passes through the joining point and is orthogonal to each of the optical axis and the first axis, wherein the flexible portion includes a first flexible portion and a second flexible portion which are separate from each other and which are connected by the joining portion, and a shape of the flexible portion is plane-symmetric with respect to a plane that includes the first axis and is parallel to the optical axis, and a plane that includes the second axis and is parallel to the optical axis.

* * * * *